United States Patent
Yang et al.

(10) Patent No.: US 9,453,153 B2
(45) Date of Patent: *Sep. 27, 2016

(54) HEAT TRANSFER FLUIDS AND CORROSION INHIBITOR FORMULATIONS FOR USE THEREOF

(71) Applicant: Prestone Products Corporation, Lake Forest, IL (US)

(72) Inventors: Bo Yang, Ridgefield, CT (US); Aleksei Gershun, Southbury, CT (US); Peter M. Woyciesjes, Woodbury, CT (US)

(73) Assignee: Prestone Products Corporation, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,105

(22) Filed: Sep. 10, 2015

(65) Prior Publication Data

US 2015/0376484 A1 Dec. 31, 2015

Related U.S. Application Data

(63) Continuation of application No. 14/087,796, filed on Nov. 22, 2013, now Pat. No. 9,145,613, which is a continuation of application No. 13/606,452, filed on Sep. 7, 2012, now Pat. No. 8,617,416.

(51) Int. Cl.
| | |
|---|---|
| C09K 5/20 | (2006.01) |
| C09K 5/00 | (2006.01) |
| C09K 5/10 | (2006.01) |
| C23F 11/08 | (2006.01) |
| C23F 11/18 | (2006.01) |

(52) U.S. Cl.
CPC . *C09K 5/00* (2013.01); *C09K 5/10* (2013.01); *C09K 5/20* (2013.01); *C23F 11/08* (2013.01); *C23F 11/184* (2013.01)

(58) Field of Classification Search
None
See application file for complete search history.

(56) References Cited

U.S. PATENT DOCUMENTS

| | | | |
|---|---|---|---|
| 3,198,820 A | 8/1965 | Pines et al. | |
| 3,203,969 A | 8/1965 | Pines et al. | |
| 3,248,329 A | 4/1966 | Pines et al. | |
| 3,312,622 A | 4/1967 | Pines et al. | |
| 3,337,496 A | 8/1967 | Pines et al. | |
| 3,341,469 A | 9/1967 | Pines et al. | |
| 4,093,641 A | 6/1978 | Plueddemann | |
| 4,287,077 A | 9/1981 | Wing | |
| 4,333,843 A | 6/1982 | Wing et al. | |
| 4,352,742 A | 10/1982 | Davis et al. | |
| 4,354,002 A | 10/1982 | Davis et al. | |
| 4,362,644 A | 12/1982 | Davis et al. | |
| 4,370,255 A | 1/1983 | Plueddemann | |
| 4,517,110 A | 5/1985 | Suzuki et al. | |
| 4,629,602 A | 12/1986 | Gousetis et al. | |
| 4,701,277 A | 10/1987 | Mohr et al. | |
| 4,772,408 A | 9/1988 | Mohr et al. | |
| 5,018,577 A | 5/1991 | Pardue et al. | |
| 5,338,477 A | 8/1994 | Chen et al. | |
| 5,454,967 A | 10/1995 | Pfitzner et al. | |
| 5,567,346 A | 10/1996 | Kakiuchi | |
| 5,606,105 A | 2/1997 | Davis et al. | |
| 5,766,506 A | 6/1998 | Mendoza et al. | |
| 5,866,042 A | 2/1999 | Chen | |
| 6,126,852 A * | 10/2000 | Turcotte | C23F 11/08 252/76 |
| 6,235,217 B1 | 5/2001 | Turcotte et al. | |
| 6,391,257 B1 | 5/2002 | Woyciesjes | |
| 6,572,789 B1 | 6/2003 | Yang et al. | |
| 7,588,694 B1 | 9/2009 | Bradshaw | |
| 7,608,198 B2 | 10/2009 | Jeffcoate | |
| 7,645,331 B2 | 1/2010 | Yang | |
| 7,662,304 B2 | 2/2010 | Woyciesjes | |
| 7,820,066 B2 | 10/2010 | Jeffcoate | |
| 7,854,253 B2 | 12/2010 | Woyciesjes | |
| 7,985,349 B2 | 7/2011 | Yang | |
| 8,216,383 B2 | 7/2012 | Yang | |
| 2004/0227124 A1 | 11/2004 | Turcotte et al. | |
| 2006/0017044 A1 | 1/2006 | Zhang et al. | |
| 2007/0034825 A1 | 2/2007 | Wenderoth | |
| 2009/0266519 A1 | 10/2009 | Marinho | |
| 2009/0294102 A1 | 12/2009 | Yang | |
| 2010/0006796 A1 | 1/2010 | Yang | |
| 2010/0059703 A1 | 3/2010 | Yang et al. | |
| 2010/0116473 A1* | 5/2010 | Yang | C09K 5/20 165/134.1 |

FOREIGN PATENT DOCUMENTS

| | | |
|---|---|---|
| CN | 10105055 | 10/2007 |
| EP | 0245557 | 11/1987 |

OTHER PUBLICATIONS

Non-final Office Action dated Mar. 15, 2013 in U.S. Appl. No. 13/606,516.

Non-final Office Action dated Mar. 15, 2013 in U.S. Appl. No. 13/606,452.

(Continued)

*Primary Examiner* — Necholus Ogden, Jr.

(74) *Attorney, Agent, or Firm* — Gregory H. Zayia; Barnes & Thornburg LLP

(57) ABSTRACT

Disclosed herein is a heat transfer fluid concentrate comprising: greater than or equal to 90 weight percent of a freezing point depressant; 16 to 80 ppm of magnesium ions; an azole compound; an inorganic phosphate; a carboxylate; and an acrylate based polymer, wherein the heat transfer fluid concentrate has a pH of 7-9.5 and the weight ratio of acrylate based polymer to magnesium ions is 1 to 25. The heat transfer fluid concentrate can be used to make a heat transfer fluid.

32 Claims, No Drawings

(56) References Cited

OTHER PUBLICATIONS

International Search Report and Written Opinion of PCT/US2013/56267 dated Sep. 13, 2013.
International Search Report and Written Opinion of PCT/US2013/56262 dated Oct. 16, 2013.
International Search Report and Written Opinion of PCT/US2013/56268 dated Sep. 19, 2013.
Search Report and Opinion issued in App. No. EP13836081.3 (Mar. 18, 2016).

* cited by examiner

HEAT TRANSFER FLUIDS AND CORROSION INHIBITOR FORMULATIONS FOR USE THEREOF

CROSS REFERENCE TO RELATED APPLICATIONS

This application is a continuation of U.S. application Ser. No. 14/087,796, filed Nov. 22, 2013, which is a continuation of U.S. application Ser. No. 13/606,452, filed Sep. 7, 2012 (now U.S. Pat. No. 8,617,416). The entire disclosure of both documents are hereby incorporated herein by reference.

BACKGROUND

Modern vehicle engines generally require a heat transfer fluid (liquid coolant) to provide long-lasting, year-round protection of their cooling systems. The primary requirements of the heat transfer fluids are that they provide efficient heat transfer to control and maintain engine temperature for efficient fuel economy and lubrication, and prevent engine failures due to freeze-up, boiling-over, or over-heating. An additional key requirement of a heat transfer fluid is that it provides corrosion protection of all cooling system metals over a wide range of temperature and operating conditions. Aluminum corrosion protection for engine block, cylinder head, water pump, heat exchangers and other components from aluminum or aluminum alloys is particularly important. Beyond metal protection, corrosion protection helps the heat transfer fluid to fulfill its primary function of transferring excess heat from the engine to the radiator for dissipation.

There is an ongoing need for heat transfer fluids having good heat transfer and corrosion protection.

BRIEF DESCRIPTION

This need is met, at least in part, by a heat transfer fluid concentrate comprising: greater than or equal to 85 weight percent of a freezing point depressant; 16 to 80 ppm of magnesium ions; an azole compound; an inorganic phosphate; a carboxylate; and an acrylate based polymer, wherein the heat transfer fluid concentrate has a pH of 7 to 9.5 and the weight ratio of acrylate based polymer to magnesium ions is 1 to 25.

The heat transfer fluid concentrate can be diluted to form a heat transfer fluid coolant comprising: less than 90 weight percent of a freezing point depressant; water; 8 to 60 ppm of magnesium ions; an azole compound; an inorganic phosphate; a carboxylic acid; greater than 0.5 ppm of calcium ions; and an acrylate based polymer, wherein the heat transfer fluid has a pH of 7-9.5 and the weight ratio of acrylate based polymer to magnesium ions is 1 to 25.

Also described herein is a heat transfer system comprising a heat transfer fluid concentrate or heat transfer coolant as described herein and a heat transfer apparatus.

DETAILED DESCRIPTION

Disclosed herein are heat transfer fluid concentrate and heat transfer fluid compositions that demonstrate a synergistic effect between the components of the composition. In a heat transfer fluid comprising ethylene glycol, water, a carboxylate, inorganic phosphate, and an azole compound the synergistic effect is observed between magnesium ions and acrylate based polymer, as shown in the corrosion tests and storage test. The optimal performance is observed when the ratio of acrylate-based polymer to magnesium ion (both in ppm or wt %) in the heat transfer fluid concentrate is 1 to 25. In the case of a heat transfer fluid, the results show that adding 1-15 ppm of calcium ions can ensure storage stability and good corrosion performance. The effect of calcium ions on the solubility of magnesium ions in the phosphate containing heat transfer fluid is particularly surprising. The highly insoluble nature of various calcium phosphate salts in aqueous solutions at pH between 7 and 9.5 would lead one of skill in the art to predict poor solubility due to solution thermodynamic considerations.

The heat transfer fluid concentrate and heat transfer fluid can be free of silicate, borate and amines. The nitrate content can be less than 50 ppm by weight based on the total weight of the heat transfer fluid concentrate or heat transfer fluid.

The freezing point depressant can be an alcohol or mixture of alcohols. Exemplary alcohols include monohydric or polyhydric alcohols and mixtures thereof. The alcohol can be selected from the group consisting of methanol, ethanol, propanol, butanol, furfurol, furfuryl alcohol, tetrahydrofurfuryl alcohol, ethoxylated furfuryl alcohol, ethylene glycol, propylene glycol, 1,3-propanediol, glycerol, diethylene glycol, triethylene glycol, 1,2-propylene glycol, 1,3-propylene glycol, dipropylene glycol, butylene glycol, glycerol-1,2-dimethyl ether, glycerol-1,3-dimethyl ether, monoethylether of glycerol, sorbitol, 1,2,6-hexanetriol, trimethylopropane, alkoxy alkanols such as methoxyethanol, and combinations of two or more of the foregoing.

In the heat transfer fluid concentrate the freezing point depressant is present in an amount greater than or equal to 85 weight percent (wt %) and less than or equal to 99 wt %, based on the total weight of the heat transfer fluid concentrate. Within this range, the amount of freezing point concentrate can be greater than or equal to 86 wt %, greater than or equal to 87 wt %, greater than or equal to 88 wt %, greater than or equal to 89 wt %, greater than or equal to 90 wt %, greater than or equal to 91 wt %, greater than or equal to 92 wt %, greater than or equal to 93 wt %, greater than or equal to 94 wt %, greater than or equal to 95 wt %, greater than or equal to 96 wt %, greater than or equal to 97 wt %, or greater than or equal to 98 wt %.

The carboxylate has 6 to 20 carbon atoms. The term "carboxylate" is inclusive of carboxylic acid, salt thereof, and combinations of a carboxylic acid and carboxylic acid salt. The carboxylate may comprise a single or multiple carboxyl groups and may be linear or branched. It is expressly contemplated that combinations of carboxylates may be used and are encompassed by the term "carboxylate" or "carboxylic acid". Exemplary aliphatic carboxylates include 2-ethyl hexanoic acid, hexanoic acid, heptanoic acid, octanoic acid, neodecanoic acid, decanoic acid, nonanoic acid, isoheptanoic acid, dodecanoic acid, sebacic acid, adipic acid, pimelic acid, suberic acid, azelaic acid, dodecanedioic acid, and combinations of two or more of the foregoing. Exemplary aromatic carboxylates include benzoic acid, toluic acid or methylbenzoic acid, tert-butyl benzoic acid, alkoxy benzoic acid, e.g., methoxybenzoic acid (or o, p, m-anisic acid), salicylic acid, phthalic acid, isophthalic acid, terephthalic acid, phenylacetic acid, mandelic acid, 1,2,4-benzenetricarboxylic acid, and combinations of two or more of the foregoing.

In the heat transfer fluid concentrate the carboxylate is present in an amount of 1 to 10 wt %, based on the total weight of the heat transfer fluid concentrate. Within this range, the amount can be greater than or equal to 1.5 wt %, or, more specifically, greater than or equal to 2 wt %. Also within this range, the amount can be less than or equal to 7 wt %, or, more specifically, less than or equal to 5 wt %.

The inorganic phosphate can be phosphoric acid, sodium orthophosphate, potassium orthophosphate, sodium pyrophosphate, potassium pyrophosphate, sodium polyphosphate, potassium polyphosphate, sodium hexametaphosphate, potassium hexametaphosphate, or a combination of two or more of the foregoing inorganic phosphates.

In the heat transfer fluid concentrate, the inorganic phosphate can be present in an amount of 0.10 wt % to 0.60 wt %, based on the total weight of the heat transfer fluid concentrate. Within this range, the amount can be greater than or equal to 0.11 wt %, or, more specifically, greater than or equal to 0.12 wt %. Also within this range, the amount can be less than or equal to 0.45 wt %, or, more specifically, less than or equal to 0.40 wt %.

The heat transfer fluid additive composition comprises an azole. Exemplary azoles include benzotriazole, tolyltriazole, methyl benzotriazole (e.g., 4-methyl benzotriazole and 5-methyl benzotriazole), butyl benzotriazole, and other alkyl benzotriazoles (e.g., the alkyl group contains from 2 to 20 carbon atoms), mercaptobenzothiazole, thiazole and other substituted thiazoles, imidazole, benzimidazole, and other substituted imidazoles, indazole and substituted indazoles, tetrazole, tetrahydrotolyltriazole, and substituted tetrazoles. Combinations of two or more of the foregoing azoles may also be used and combinations of azoles are included in the term "azole".

In the heat transfer fluid concentrate, the azole compound can be present in an amount of 0.01 wt % to 3 wt %, based on the total weight of the heat transfer fluid concentrate. Within this range, the azole compound can be present in an amount greater than or equal to 0.05 wt %, or, more specifically, greater than or equal to 0.1 wt %. Also within this range, the azole compound can be present in an amount less than or equal to 2 wt %, or, more specifically, less than or equal to 1 wt %.

The magnesium ions are derived from a magnesium compound that can produce magnesium ions upon dissolving in a water containing solution at room temperature. The magnesium compound can be an inorganic magnesium compound such as magnesium nitrate, magnesium sulfate, magnesium molybdate, magnesium tungstate, magnesium vanadate, magnesium perchlorate, magnesium hydroxide or a combination thereof. The magnesium compound is soluble in the heat transfer fluid. Soluble, as used herein, is defined as dissolving such that no particulate matter is visible to the naked eye. The magnesium compound can also be magnesium salt formed between magnesium ions and an organic acid containing one or more carboxylic acid groups, such as magnesium polyacrylate, magnesium polymaleate, magnesium lactate, magnesium citrate, magnesium tartrate, magnesium gluconate, magnesium glucoheptonate, magnesium glycolate, magnesium glucarate, magnesium succinate, magnesium hydroxysuccinate, magnesium adipate, magnesium oxalate, magnesium malonate, magnesium sulfamate, magnesium formate, magnesium acetate, magnesium propionate, magnesium salt of aliphatic tri-carboxylic acid or aliphatic tetra-carboxylic acid, and combinations of the foregoing magnesium compounds.

In the heat transfer fluid concentrate, the magnesium compound is present in an amount such that the heat transfer fluid has a magnesium ion concentration of 16 to 80 parts per million by weight (ppm) of the heat transfer fluid concentrate. Within this range, the magnesium ion concentration can be greater than or equal to 20 ppm, or, more specifically, greater than or equal to 22 ppm. Also within this range, the magnesium ion concentration can be less than or equal to 75 ppm, or, more specifically, less than or equal to 70 ppm.

The heat transfer fluid concentrate comprises an acrylate-based polymer. The acrylate based polymer is a water soluble polymer (average molecular weight of 200 to 200,000 Daltons). Exemplary acrylate polymers include polyacrylates, acrylate based polymers, copolymers, terpolymers, and quadpolymers, such as acrylate/acrylamide copolymers, polymethacrylates, polymaleic acids or maleic anhydride polymers, maleic acid based polymers, their copolymers and terpolymers, modified acrylamide based polymers, including polyacrylamides, acrylamide based copolymers and terpolymers. In general, water soluble polymers suitable for use include homo-polymers, copolymers, terpolymer and inter-polymers having (1) at least one monomeric unit containing $C_3$ to $C_{16}$ monoethylenically unsaturated mono- or dicarboxylic acids or their salts; or (2) at least one monomeric unit containing $C_3$ to $C_{16}$ monoethylenically unsaturated mono- or dicarboxylic acid derivatives such as amides, nitriles, carboxylate esters, acid halides (e.g., chloride), and acid anhydrides, and combination thereof. In some embodiments, the acrylate based polymer comprises a phosphinopolyacrylate.

In the heat transfer fluid concentrate (and the heat transfer fluid made from the concentrate), the amount of acrylate based polymer is chosen based on the amount of the magnesium ions. The ratio of acrylate-based polymer to magnesium ions is greater than 1 and less than 25. Within this range, the ratio can be greater than or equal to 2 or, more specifically, greater than or equal to 3. Also within this range, the ratio can be less than or equal to 20, or, more specifically, less than or equal to 15. The ratio of acrylate ions is determined using the amount (the weight) of acrylate-based polymer dissolved in the concentrate.

The heat transfer fluid concentrate can further comprise calcium ions. The calcium ions are derived from a calcium compound that can produce calcium ions upon dissolving in a water containing solution at room temperature. The calcium compound can be an inorganic calcium compound such as calcium nitrate, calcium chloride, calcium perchlorate, calcium molybdate, calcium tungstate, calcium vanadate, calcium hydroxide, or a combination thereof. The calcium compound is soluble in the heat transfer fluid. Soluble, as used herein, is defined as dissolving such that no particulate matter is visible to the naked eye. The calcium compound can also be calcium salt formed between calcium ions and an organic acid containing one or more carboxylic acid groups, such as calcium polyacrylate, calcium polymaleate, calcium lactate, calcium citrate, calcium tartrate, calcium gluconate, calcium glucoheptonate, calcium glycolate, calcium glucarate, calcium succinate, calcium hydroxysuccinate, calcium adipate, calcium oxalate, calcium malonate, calcium sulfamate, calcium formate, calcium acetate, calcium propionate, calcium salts of aliphatic tri-carboxylic acid or aliphatic tetra-carboxylic acid, and combinations of the foregoing calcium compounds.

The calcium compound is present in an amount such that the heat transfer fluid concentrate has a calcium ion concentration of greater than 0.5 parts per million, based on the total weight of the heat transfer fluid. Within this range, the amount of calcium ions can be less than 20 ppm. Also within this range, the amount of calcium ions can be less than or equal to 10 ppm.

The heat transfer fluid can further comprise lithium ions. The lithium ions are derived from a lithium compound that can produce lithium ions upon dissolving in a water containing solution at room temperature. The lithium compound can be an inorganic lithium compound such as lithium hydroxide, lithium phosphate, lithium borate, lithium nitrate, lithium perchlorate, lithium sulfate, lithium molybdate, lithium vanadate, lithium tungstate, lithium carbonate or a combination thereof. The lithium compound is soluble in the heat transfer fluid. Soluble, as used herein, is defined as dissolving such that no particulate matter is visible to the naked eye. The lithium compound can also be lithium salt formed between lithium ions and an organic acid containing one or more carboxylic acid groups, such as lithium acetate, lithium benzoate, lithium polyacrylate, lithium polymaleate, lithium lactate, lithium citrate, lithium tartrate, lithium gluconate, lithium glucoheptonate, lithium glycolate, lithium glucarate, lithium succinate, lithium hydroxyl succinate, lithium adipate, lithium oxalate, lithium malonate, lithium sulfamate, lithium formate, lithium propionate, lithium salt of aliphatic mono-, di- or tri-carboxylic acid or aromatic mono-, di- or tri-carboxylic acid, and combinations of the foregoing lithium compounds.

The lithium compound can be present in an amount such that the heat transfer fluid concentrate has a lithium ion concentration of 50 to 2000 parts per million by weight (ppm) of the heat transfer fluid. Within this range, the lithium ion concentration can be less than or equal to 1500 ppm, or more specifically, less than or equal to 1000 ppm. Also within this range, the lithium ion concentration can be greater than or equal to 60 ppm, or more specifically, greater than or equal to 65 ppm.

The pH of the heat transfer fluid concentrate is 7 to 9.5 at room temperature. Within this range, the pH can be greater than or equal to 7.5, or, greater than or equal to 7.8. Also within this range, the pH can be less than or equal to 9.0, or, less than or equal to 8.8.

The heat transfer fluid concentrate can further comprise a phosphonocarboxylate. Phosphonocarboxylates are phosphonated compounds having the general formula

wherein at least one R group in each unit is a COOM, $CH_2OH$, sulphono or phosphono group and the other R group which may be the same as, or different from, the first R group, is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group, n is 1 or an integer greater than 1, and each M is hydrogen or an alkali metal ion such as a sodium ion, potassium ion and the like. Furthermore, at least one COOM group will be present in one of the R groups. Preferably, the phosphonocarboxylates are phosphonated oligomers or mixture of phosphonated oligomers of maleic acid, of the formula H[CH(COOM)CH(COOM)]$_n$—PO$_3$M$_2$, where n is 1 or an integer greater than 1, and M is a cationic species (e.g., alkali metal cations) such that the compound is water soluble. Exemplary phosphonocarboxylates include phosphonosuccinic acid, 1-phosphono-1,2,3,4-tetracarboxybutane, and 1-phosphono-1,2,3,4,5,6-hexacarboxyhexane. The phosphonocarboxylates can be a mixture of compounds having the preceding formula with differing values for "n". The mean value of "n" can be 1 to 2, or, more specifically, 1.3 to 1.5. The synthesis of the phosphonocarboxylates is known and described in U.S. Pat. No. 5,606,105. The phosphonocarboxylates are separate and different from the carboxylates described above. The carboxylate described above consists of carbon, hydrogen and oxygen and are free of non-oxygen heteroatoms.

In the heat transfer fluid concentrate, the phosphonocarboxylate can be present in an amount of 10 to 500 ppm, based on the total weight of the heat transfer fluid concentrate. Within this range, the phosphonocarboxylate can be present in an amount greater than or equal to 20 ppm, or, greater than or equal to 40 ppm. Also within this range, the phosphonocarboxylate can be present in an amount less than or equal to 400 ppm, or, less than or equal to 300 ppm.

The heat transfer fluid concentrate may further comprise a phosphinocarboxylate. Phosphinocarboxylates are compounds having the general formula

wherein at least one $R^1$ group in each unit is a COOM, $CH_2OH$, sulphono or phosphono group and the other $R^1$ group which may be the same as, or different from, the first $R^1$ group, is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group, n is an integer equal to or greater than 1, and each M is hydrogen or an alkali metal ion such as a sodium ion, potassium ion and the like. Similarly, at least one $R^2$ group in each unit is a COOM, $CH_2OH$, sulphono or phosphono group and the other $R^2$ group which may be the same as, or different from, the first $R^2$ group, is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group, m is an integer equal to or greater than 0. Furthermore, at least one COOM group will be present in one of the $R^1$ and $R^2$ groups. Exemplary phosphinocarboxylates include phosphinicosuccinic acid and water soluble salts, phosphinicobis(succinic acid) and water soluble salts and phosphinicosuccinic acid oligomer and salts as described in U.S. Pat. Nos. 6,572,789 and 5,018,577. The phosphonocarboxylates can be a mixture of compounds having the preceding formula with differing values for "n" and "m". The phosphinocarboxylates are separate and different from the carboxylates described above.

In the heat transfer fluid concentrate, the phosphinocarboxylate can be present in an amount of 10 to 500 ppm, based on the total weight of the heat transfer fluid concentrate. Within this range, the phosphinocarboxylate can be present in an amount greater than or equal to 20 ppm, or, greater than or equal to 40 ppm. Also within this range, the phosphinocarboxylate can be present in an amount less than or equal to 400 ppm, or, less than or equal to 300 ppm.

The heat transfer fluid concentrate (and hence the heat transfer fluid) may optionally comprise one or more of an antifoaming agent or defoamer, dispersant, scale inhibitor, surfactant, colorant and other coolant additives.

Exemplary antifoam agents include polydimethylsiloxane emulsion based antifoams. They include PC-5450NF from Performance Chemicals, LLC in Boscawen, N.H.; CNC antifoam XD-55 NF and XD-56 from CNC International in Woonsocket in R.I. Other antifoams suitable for use in the instant invention include copolymers of ethylene oxide (EO) and propylene oxide (PO), such as Pluronic L-61 from BASF.

Generally, the optional antifoam agents may comprise a silicone, for example, SAG 10 or similar products available from OSI Specialties, Dow Corning or other suppliers; an ethylene oxide-propylene oxide (EO-PO) block copolymer and a propylene oxide-ethylene oxide-propylene oxide (PO-EP-PO) block copolymer (e.g., Pluronic L61, Pluronic L81, or other Pluronic and Pluronic C products); poly(ethylene oxide) or poly(propylene oxide), e.g., PPG 2000 (i.e., polypropylene oxide with an average molecular weight of 2000); a hydrophobic amorphous silica; a polydiorganosiloxane based product (e.g., products containing polydimethylsiloxane (PDMS), and the like); a fatty acids or fatty acid ester (e.g., stearic acid, and the like); a fatty alcohol, an alkoxylated alcohol and a polyglycol; a polyether polyol acetate, a polyether ethoxylated sorbital hexaoleate, and a poly(ethylene oxide-propylene oxide) monoallyl ether acetate; a wax, a naphtha, kerosene and an aromatic oil; and combinations comprising one or more of the foregoing antifoam agents.

Exemplary surfactants include fatty acid esters, such as sorbitan fatty acid esters, polyalkylene glycols, polyalkylene glycol esters, copolymers of ethylene oxide (EO) and propylene oxide (PO), polyoxyalkylene derivatives of a sorbitan fatty acid ester, and mixtures thereof. The average molecular weight of the non-ionic surfactants can be 55 to 300,000, or, more specifically 110 to 10,000. Suitable sorbitan fatty acid esters include sorbitan monolaurate (e.g., sold under trade name Span® 20, Arlacel® 20, S-MAZ® 20M1), sorbitan monopalmitate (e.g., Span® 40 or Arlacel® 40), sorbitan monostearate (e.g., Span® 60, Arlacel® 60, or S-MAZ® 60K), sorbitan monooleate (e.g., Span® 80 or Arlacel® 80), sorbitan monosesquioleate (e.g., Span® 83 or Arlacel® 83), sorbitan trioleate (e.g., Span® 85 or Arlacel® 85), sorbitan tridtearate (e.g., S-MAZ® 65K), sorbitan monotallate (e.g., S-MAZ® 90). Suitable polyalkylene glycols include polyethylene glycols, polypropylene glycols, and mixtures thereof. Examples of polyethylene glycols suitable for use include CARBOWAX™ polyethylene glycols and methoxypolyethylene glycols from Dow Chemical Company, (e.g., CARBOWAX PEG 200, 300, 400, 600, 900, 1000, 1450, 3350, 4000 & 8000, etc.) or PLURACOL® polyethylene glycols from BASF Corp. (e.g., Pluracol® E 200, 300, 400, 600, 1000, 2000, 3350, 4000, 6000 and 8000, etc.). Suitable polyalkylene glycol esters include mono- and di-esters of various fatty acids, such as MAPEG® polyethylene glycol esters from BASF (e.g., MAPEG® 200ML or PEG 200 Monolaurate, MAPEG® 400 DO or PEG 400 Dioleate, MAPEG® 400 MO or PEG 400 Monooleate, and MAPEG® 600 DO or PEG 600 Dioleate, etc.). Suitable copolymers of ethylene oxide (EO) and propylene oxide (PO) include various Pluronic and Pluronic R block copolymer surfactants from BASF, DOWFAX non-ionic surfactants, UCON™ fluids and SYNALOX lubricants from DOW Chemical. Suitable polyoxyalkylene derivatives of a sorbitan fatty acid ester include polyoxyethylene 20 sorbitan monolaurate (e.g., products sold under trademarks TWEEN 20 or T-MAZ 20), polyoxyethylene 4 sorbitan monolaurate (e.g., TWEEN 21), polyoxyethylene 20 sorbitan monopalmitate (e.g., TWEEN 40), polyoxyethylene 20 sorbitant monostearate (e.g., TWEEN 60 or T-MAZ 60K), polyoxyethylene 20 sorbitan monooleate (e.g., TWEEN 80 or T-MAZ 80), polyoxyethylene 20 tristearate (e.g., TWEEN 65 or T-MAZ 65K), polyoxyethylene 5 sorbitan monooleate (e.g., TWEEN 81 or T-MAZ 81), polyoxyethylene 20 sorbitan trioleate (e.g., TWEEN 85 or T-MAZ 85K) and the like.

The heat transfer fluid concentrate can be diluted, typically with water, to form a heat transfer fluid. For example, the heat transfer fluid concentrate can be diluted by 10 to 75 volume percent to form the heat transfer fluid. In some embodiments, the water used for dilution is deionized water as described in Section 4.5 of ASTM D3306-10.

In the heat transfer fluid the freezing point depressant is present in an amount of 1 wt % to less than 90 wt %, based on the total weight of the heat transfer fluid. Within this range, the amount of the freezing point depressant can be greater than or equal to 30 wt %, greater than or equal to 40 wt %, greater than or equal to 50 wt %, greater than or equal to 55 wt %, greater than or equal to 60 wt %, greater than or equal to 70 wt %, greater than or equal to 75 wt %, greater than or equal to 80 wt %, greater than or equal to 85 wt %, greater than or equal to 86 wt %, greater than or equal to 87 wt %, greater than or equal to 88 wt %, or greater than or equal to 89 wt %, but less than 90 wt % based on the total weight of the heat transfer fluid. Also, within this range, the amount of the freezing point depressant can be less than or equal to 30 wt %, less than or equal to 40 wt %, less than or equal to 50 wt %, less than or equal to 55 wt %, less than or equal to 60 wt %, less than or equal to 70 wt %, less than or equal to 75 wt %, less than or equal to 80 wt %, less than or equal to 85 wt %, less than or equal to 86 wt %, less than or equal to 87 wt %, less than or equal to 88 wt %, or less than or equal to 89 wt %, but more than 1 wt % based on the total weight of the heat transfer fluid.

In the heat transfer fluid, the carboxylate is present in an amount of 0.5 to 8 wt %, based on the total weight of the heat transfer fluid. Within this range, the amount can be greater than or equal to 0.6 wt %, or, more specifically, greater than or equal to 0.7 wt %. Also within this range, the amount can be less than or equal to 7 wt %, or, more specifically, less than or equal to 6 wt %.

In the heat transfer fluid, the inorganic phosphate can be present in an amount of 0.05 wt % to 0.4 weight percent, based on the total weight of the heat transfer fluid. Within this range, the amount can be greater than or equal to 0.07 wt %, or, more specifically, greater than or equal to 0.08 wt %. Also within this range, the amount can be less than or equal to 0.35 wt %, or, more specifically, less than or equal to 0.30 wt %.

In the heat transfer fluid, the azole compound can be present in an amount of 0.005 wt % to 2 wt %, based on the total weight of the heat transfer fluid. Within this range, the azole compound can be present in an amount greater than or equal to 0.007 wt %, or, more specifically, greater than or equal to 0.01 wt %. Also within this range, the azole compound can be present in an amount less than or equal to 1.5 wt %, or, more specifically, less than or equal to 1 wt %.

In the heat transfer fluid, the magnesium compound is present in an amount such that the heat transfer fluid has a magnesium ion concentration of 2 to 60 parts per million by weight (ppm) of the heat transfer fluid. Within this range, the magnesium ion concentration can be greater than or equal to 4 ppm, or, more specifically, greater than or equal to 6 ppm. Also within this range, the magnesium ion concentration can be less than or equal to 65 ppm, or, more specifically, less than or equal to 60 ppm.

The calcium compound can be present in an amount such that the heat transfer fluid has a calcium ion concentration of greater than 0.5 parts per million, based on the total weight of the heat transfer fluid. Within this range, the amount of calcium ions can be less than 60 ppm. Also within this range, the amount of calcium ions can be less than or equal to 40 ppm.

The lithium compound can be present in an amount such that the heat transfer fluid has a lithium ion concentration of 20 to 1800 parts per million by weight (ppm) of the heat transfer fluid. Within this range, the lithium ion concentration can be less than or equal to 1200 ppm, or more specifically, less than or equal to 900ppm. Also within this range, the lithium ion concentration can be greater than or equal to 30 ppm, or more specifically, greater than or equal to 65 ppm.

The pH of the heat transfer fluid is 7 to 9.5 at room temperature. Within this range, the pH can be greater than or equal to 7.5, or, greater than or equal to 7.8. Also within this range, the pH can be less than or equal to 9.0, or, less than or equal to 8.8.

A method of preventing corrosion comprises contacting a heat transfer fluid as described herein with a heat transfer system. The heat transfer system can comprise components made by controlled atmosphere brazing. The heat transfer system may comprise aluminum.

It is also contemplated that in some applications, such as heavy duty engines, it may be desirable to incorporate one or more additional corrosion inhibitors such as nitrites, molybdates, and salts thereof.

The heat transfer fluid is further demonstrated by the following non-limiting examples.

EXAMPLES

The examples were made using the materials shown in Table 1.

TABLE 1

| Component | Description |
| --- | --- |
| EG | Ethylene glycol |
| Na tolyltriazole | 50 wt % solution of sodium tolyltriazole |

TABLE 1-continued

| Component | Description |
| --- | --- |
| Na hydroxide | 50 wt % solution of sodium hydroxide |
| Neodecanoic acid | Neodecanoic acid |
| 2-ethyl hexanoic acid | 2-ethyl hexanoic acid |
| PM-5150 | An anti-foam EMCO |
| $H_3PO_4$ | A 75 wt % of $H_3PO_4$ |
| DI $H_2O$ | Deionized water |
| $Mg(NO3)_2*6H_2O$ | Hexahydrated magnesium nitrate; (MW = 256.30) |
| $Mg(Ac)_2*4H_2O$ | Tetrahydrated magnesium acetoacetate; (MW = 214.45) |
| $Ca(Ac)_2*H_2O$ | Tetrahydrated calcium acetoacetate; (MW = 176.18) |
| AR-940 | Sodium polyacrylate (MW = 2600) aqueous solution, 40% solid, pH = 8.3 |
| Acumer 3100 | AA/AM/AMPS terpolymer, (MW = 4500), 43.5% solid, pH = 2.1-3.0 |
| Acumer 4161 | Phosphino polycarboxylic acid, (MW = 3600), 51% solid, pH = 3.3 |
| BTCA | 1,2,3,4-butane tetracarboxylic acid |

The concentrate compositions shown in Table 2 were made by mixing the listed ingredients and less than 0.03 weight percent of a dye. The concentrate was diluted to 25 volume percent with deionized water and 100 ppm of chloride was added. A modified GM9066P test was run on the diluted solution using sand cast aluminum 319 at 263±3 degrees Fahrenheit. Results are shown below in Table 2.

| Example | 1* | 2* | 3 | 4 | 5 | 6 | 7 | 8 | 9 |
| --- | --- | --- | --- | --- | --- | --- | --- | --- | --- |
| EG | 93.12 | 92.91 | 93.48 | 93.43 | 93.41 | 93.43 | 93.56 | 93.49 | 93.47 |
| Na tolyltriazole | 0.47 | 0.47 | 0.47 | 0.47 | 0.47 | 0.47 | 0.47 | 0.47 | 0.47 |
| Na hydroxide | 2.19 | 2.28 | 2.07 | 2.07 | 2.07 | 2.05 | 2.00 | 2.03 | 2.066 |
| Neodecanoic acid | 0.96 | 0.95 | 0.85 | 0.90 | 0.90 | 0.89 | 0.86 | 0.86 | 0.86 |
| 2-ethyl hexanoic acid | 2.87 | 2.87 | 2.56 | 2.70 | 2.70 | 2.68 | 2.58 | 2.58 | 2.58 |
| PM-5150 | 0.20 | 0.20 | 0.18 | 0.19 | 0.19 | 0.18 | 0.19 | 0.18 | 0.18 |
| $H_3PO_4$ | 0.17 | 0.25 | 0.25 | 0.17 | 0.17 | 0.17 | 0.25 | 0.25 | 0.25 |
| DI H2O | — | 0.05 | 0.03 | 0.03 | 0.03 | 0.03 | 0.02 | 0.02 | 0.02 |
| Mg(NO3)2*6H2O | — | — | — | — | — | 0.03 | — | — | — |
| Mg(Ac)2*4H2O | — | — | 0.03 | 0.03 | 0.03 | — | 0.02 | 0.02 | 0.02 |
| Ca(Ac)2*H2O | — | 0.01 | — | — | — | — | — | 0.002 | 0.002 |
| AR-940 | — | — | 0.06 | 0.01 | 0.01 | 0.04 | 0.03 | 0.07 | 0.07 |
| Acumer 3100 | — | — | — | — | 0.01 | 0.01 | — | — | — |
| Acumer 4161 | — | — | — | — | — | — | 0.02 | — | — |
| BTCA | — | — | — | — | — | — | — | — | — |
| Calculated Mg concentration, mg/kg | 0.0 | 0.0 | 34.0 | 34.01 | 34.01 | 28.4 | 22.67 | 25.0 | 24.9 |
| Calculated Ca concentration, mg/kg | 0.0 | 28.7 | — | — | — | — | — | 3.5 | 3.6 |
| ppm Polyacrylate/ppm Mg | 0.00 | 0.00 | 7.06 | 1.76 | 1.18 | 5.62 | 6.18 | 11.22 | 11.23 |
| 1 hr LPR CorrRate, mpy @ 263 F. | 9.8524 | 9.1596 | 0.4406 | 0.7125 | 0.9555 | 0.4280 | 0.4351 | 0.7588 | 0.5979 |
| 1 hr Ecorr, V/AgAgCl | −0.9378 | −0.9771 | −0.8828 | −0.8855 | −0.8894 | −0.8560 | −0.8271 | −0.8660 | −0.8578 |
| 3 hr LPR CorrRate, mpy @263 F. | 8.9671 | 9.1923 | 0.2657 | 0.2719 | 0.4519 | 0.2809 | 0.5152 | 0.5404 | 0.3614 |
| 3 hr Ecorr, V/AgAgCl | −0.9141 | −0.9196 | −0.8357 | −0.8495 | −0.8608 | −0.8173 | −0.8201 | −0.8410 | −0.8344 |
| 5 hr LPR CorrRate, mpy @ 263 F. | 8.4252 | 9.1100 | 0.2231 | 0.3036 | 0.3930 | 0.2074 | 0.4127 | 0.4572 | 0.3984 |
| 5 hr Ecorr, V/AgAgCl | −0.9055 | −0.9036 | 0.8304 | −0.8268 | −0.8423 | −0.7988 | −0.8310 | −0.8312 | −0.8187 |

*Comparative example

The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another. The various embodiments and ranges described herein are combinable to the extent that the description is not contradictory.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

The invention claimed is:

1. A heat transfer fluid concentrate comprising:
    a freezing point depressant in an amount of 85 wt. % to 99 wt. % based on a total weight of the heat transfer fluid concentrate;
    a carboxylate in an amount of 1 wt. % to 10 wt. % based on the total weight of the heat transfer fluid concentrate;
    an inorganic phosphate in an amount of 0.10 wt. % to 0.60 wt. % based on the total weight of the heat transfer fluid concentrate;
    an azole compound in an amount of 0.01 wt. % to 3 wt. % based on the total weight of the heat transfer fluid concentrate;
    magnesium ions in an amount of 16 ppm to 80 ppm by weight of the heat transfer fluid concentrate; and
    an acrylate-based polymer in an amount wherein a ratio of the acrylate-based polymer to the magnesium ions is from 1 to 25.

2. The heat transfer fluid concentrate of claim 1 further comprising calcium ions in an amount greater than 0.5 ppm by weight of the heat transfer fluid concentrate.

3. The heat transfer fluid concentrate of claim 2 wherein the calcium ions are derived from a calcium salt of an organic acid.

4. The heat transfer fluid concentrate of claim 1 wherein a pH of the heat transfer fluid concentrate is from 7 to 9.5.

5. The heat transfer fluid concentrate of claim 1 wherein the freezing point depressant comprises an alcohol.

6. The heat transfer fluid concentrate of claim 1 wherein the freezing point depressant comprises ethylene glycol.

7. The heat transfer fluid concentrate of claim 1 wherein the carboxylate comprises a plurality of carboxylates.

8. The heat transfer fluid concentrate of claim 1 wherein the carboxylate comprises an aliphatic carboxylate, an aromatic carboxylate, or a combination thereof.

9. The heat transfer fluid concentrate of claim 1 wherein the carboxylate comprises 2-ethyl hexanoic acid, neodecanoic acid, or a combination thereof.

10. The heat transfer fluid concentrate of claim 1 wherein the inorganic phosphate comprises phosphoric acid.

11. The heat transfer fluid concentrate of claim 1 wherein the azole compound comprises a benzotriazole, a tolyltriazole, or a combination thereof.

12. The heat transfer fluid concentrate of claim 1 wherein the magnesium ions are derived from a magnesium salt of an organic acid.

13. The heat transfer fluid concentrate of claim 1 wherein the acrylate-based polymer comprises a polyacrylate.

14. The heat transfer fluid concentrate of claim 1 wherein the heat transfer fluid concentrate is free of silicate, borate, and amines.

15. A heat transfer fluid concentrate comprising:
    ethylene glycol in an amount of 90 wt. % to 98 wt. % based on a total weight of the heat transfer fluid concentrate;
    an aliphatic carboxylate in an amount of 1.5 wt. % to 7 wt. % based on the total weight of the heat transfer fluid concentrate;
    phosphoric acid in an amount of 0.11 wt. % to 0.45 wt. % based on the total weight of the heat transfer fluid concentrate;
    a tolyltriazole in an amount of 0.05 wt. % to 2 wt. % based on the total weight of the heat transfer fluid concentrate;
    calcium ions in an amount of 0.5 ppm to 20 ppm by weight of the heat transfer fluid concentrate;
    magnesium ions in an amount of 20 ppm to 75 ppm by weight of the heat transfer fluid concentrate; and
    a polyacrylate in an amount wherein a ratio of the polyacrylate to the magnesium ions is from 1 to 25.

16. The heat transfer fluid concentrate of claim 15 wherein:
    the aliphatic carboxylate comprises 2-ethyl hexanoic acid and neodecanoic acid;
    the calcium ions are derived from a calcium salt of an organic acid; and
    the magnesium ions are derived from a magnesium salt of an organic acid.

17. The heat transfer fluid concentrate of claim 15 wherein the ratio of the polyacrylate to the magnesium ions is from 2 to 20.

18. A heat transfer fluid comprising:
    water;
    a freezing point depressant in an amount of 1 wt. % to 90 wt. % based on a total weight of the heat transfer fluid;
    a carboxylate in an amount of 0.5 wt. % to 8 wt. % based on the total weight of the heat transfer fluid;
    an inorganic phosphate in an amount of 0.05 wt. % to 0.40 wt. % based on the total weight of the heat transfer fluid;
    an azole compound in an amount of 0.005 wt. % to 2 wt. % based on the total weight of the heat transfer fluid;
    magnesium ions in an amount of 2 ppm to 60 ppm by weight of the heat transfer fluid; and
    an acrylate-based polymer in an amount wherein a ratio of the acrylate-based polymer to the magnesium ions is from 1 to 25.

19. The heat transfer fluid of claim 18 further comprising calcium ions in an amount greater than 0.5 ppm by weight of the heat transfer fluid.

20. The heat transfer fluid of claim 19 wherein the calcium ions are derived from a calcium salt of an organic acid.

21. The heat transfer fluid of claim 18 wherein a pH of the heat transfer fluid is from 7 to 9.5.

22. The heat transfer fluid of claim 18 wherein the freezing point depressant comprises an alcohol.

23. The heat transfer fluid of claim 18 wherein the freezing point depressant comprises ethylene glycol.

24. The heat transfer fluid of claim 18 wherein the carboxylate comprises a plurality of carboxylates.

25. The heat transfer fluid of claim 18 wherein the carboxylate comprises an aliphatic carboxylate, an aromatic carboxylate, or a combination thereof.

26. The heat transfer fluid of claim 18 wherein the carboxylate comprises 2-ethyl hexanoic acid, neodecanoic acid, or a combination thereof.

27. The heat transfer fluid of claim 18 wherein the inorganic phosphate comprises phosphoric acid.

28. The heat transfer fluid of claim 18 wherein the azole compound comprises a benzotriazole, a tolyltriazole, or a combination thereof.

29. The heat transfer fluid of claim 18 wherein the magnesium ions are derived from a magnesium salt of an organic acid.

30. The heat transfer fluid of claim 18 wherein the acrylate-based polymer comprises a polyacrylate.

31. The heat transfer fluid of claim 18 wherein the heat transfer fluid is free of silicate, borate, and amines.

32. A heat transfer fluid comprising:
water;
ethylene glycol in an amount of 30 wt. % to 90 wt. % based on a total weight of the heat transfer fluid;
an aliphatic carboxylate in an amount of 0.6 wt. % to 7 wt. % based on the total weight of the heat transfer fluid;
phosphoric acid in an amount of 0.07 wt. % to 0.35 wt. % based on the total weight of the heat transfer fluid;
a tolyltriazole in an amount of 0.007 wt. % to 1.5 wt. % based on the total weight of the heat transfer fluid;
calcium ions in an amount of 0.5 ppm to 60 ppm by weight of the heat transfer fluid;
magnesium ions in an amount of 4 ppm to 65 ppm by weight of the heat transfer fluid;
and a polyacrylate in an amount wherein a ratio of the polyacrylate to the magnesium ions is from 1 to 25.

* * * * *